Patented May 13, 1952

2,596,100

UNITED STATES PATENT OFFICE 2,596,100

OBTENTION OF METALLIC ANTIMONY

Jean Joseph Listrat, Noyelles-Godault, France, assignor of one-half to Societe Anonyme dite: Societe Miniere et Metallurgique de Penarroya, Paris, France, a corporation of France No Drawing. Application February 11, 1948, Serial No. 7,730. In France October 30, 1946

Section 1, Public Law 690, August 8, 1946
Patent expires October 30, 1966

2 Claims. (Cl. 75—69)

The present invention relates to a method for the direct obtention of metallic antimony in a single metallurgical operation, starting from rich, sulphurized antimony ores (crudum or ores concentrated by hand or flotation).

It has already been found out that antimony trisulphide can dissociate in its elements: metal and sulphur, without formation of subsulphides, when heated at high temperatures. The said dissociation which develops first of all very slowly, accelerates as the temperature rises. But, at the same time, the vapour tension of the trisulphide rises and part of the latter is volatilized, thus escaping dissociation. This latter operation is thus only very partial and the metal yield is so low that the operation has no industrial interest.

Now, it has been found that the yield of metallic antimony is highly increased if, instead of heating progressively the whole mass of trisulphide under treatment until it reaches the temperature at which the dissociation is sufficiently rapid, the said mass is, according to the invention, heated up to melting temperature, whereafter the external heating is cut off and hot air is blown into the mass at such a temperature and in such a quantity that the whole mass is maintained in a melted state and that, at the point of injection of the air, a temperature is maintained which is constant and sufficiently high to insure a local dissociation.

At the contact points between the hot air and the melted trisulphide, an immediate and considerable elevation of temperature is thus produced, due to the exothermic reaction between the air and the sulphide.

In the action zone of air injection and in this zone only, there occurs simultaneously a dissociation of the sulphide which is not in direct contact with the oxygen of the injected air and a formation of oxide, said oxide reacting in its turn upon the sulphide. The formation of metal occurs in both cases.

The excess calories let out in the said zone are absorbed, on one hand, by the maintaining of the mass in a melted state and, on the other hand, by the reduction operation of the trisulphide by the oxide. Thus, the volatilization of trisulphide is reduced to a minimum.

For treating for instance a mass of ore of 1000 kg. one may blow into said mass, previously brought slightly above melting point 200 cub. m. of air at 500° C. per hour.

The operation may be carried out in an appropriate converter. It may advantageously be rendered continuous, the obtained metal being periodically extracted and the mass of ore maintained at a constant value by adding compensating quantities of cold ore.

The means for injecting air, the shape of the converter the means for extracting the metal, as well as the means for preheating the ore and heating the injected air, for instance in the latter case, by recuperated calories, may be varied without departing from the principle of the invention.

I claim:

1. A method for directly obtaining metallic antimony from rich sulphurized antimony ores, consisting in heating a mass of ore up to the melting point of the mass, cutting off the external heating and blowing hot air at points inside the mass at such a temperature and in such a quantity that the temperature of the zone of the mass adjacent the points of injection of the air is raised above the dissociation temperature of the trisulphide ore, the remainder of the mass remaining a little above the melting temperature.

2. A method for directly obtaining metallic antimony from rich sulphurized antimony ores, consisting in heating a mass of ore up to the melting point of the mass, cutting off the external heating and blowing hot air at points inside the mass at such a temperature and in such a quantity that the temperature of the zone of the mass adjacent the points of injection of the air is raised above the dissociation temperature of the trisulphide ore, extracting the metallic antimony as it forms and adding fresh ore to the mass under treatment in such a quantity that said mass is maintained at a temperature a little above the melting temperature.

JEAN JOSEPH LISTRAT.

REFERENCES CITED

The following references are of record in the file of this patent:

UNITED STATES PATENTS

| Number | Name | Date |
|---|---|---|
| 527,312 | Austin | Oct. 9, 1894 |
| 746,970 | MacDonald | Dec. 15, 1903 |
| 822,713 | Baggaley et al. | June 5, 1906 |
| 860,512 | Arden | July 16, 1907 |

FOREIGN PATENTS

| Number | Country | Date |
|---|---|---|
| 941,870 | France | Sept. 6, 1948 |